INVENTORS.
HERMAN G. KLEMM &
ALEXANDER H. MARK
BY
ATTORNEYS.

INVENTORS.
HERMAN G. KLEMM &
ALEXANDER H. MARK
BY

ATTORNEYS.

April 7, 1964   H. G. KLEMM ETAL   3,127,898
THRESHING CYLINDER CONSTRUCTION
Original Filed March 13, 1961   6 Sheets-Sheet 3

INVENTORS.
HERMAN G. KLEMM &
ALEXANDER H. MARK
BY

ATTORNEYS.

April 7, 1964   H. G. KLEMM ETAL   3,127,898
THRESHING CYLINDER CONSTRUCTION
Original Filed March 13, 1961   6 Sheets-Sheet 6

INVENTORS.
HERMAN G. KLEMM &
ALEXANDER H. MARK
BY

ATTORNEYS.

United States Patent Office 3,127,898
Patented Apr. 7, 1964

3,127,898
THRESHING CYLINDER CONSTRUCTION
Herman G. Klemm, Birmingham, and Alexander H. Mark, Livonia, Mich., assignors to Massey-Ferguson Limited, Toronto, Ontario, Canada, a corporation of Canada
Continuation of applications Ser. Nos. 95,203 and 95,250, Mar. 13, 1961. This application May 28, 1962, Ser. No. 200,017
4 Claims. (Cl. 130—27)

This invention relates to threshing machines, combines and like equipment and more particularly to the threshing cylinder used with such equipment.

The present application is a continuation of our two applications Serial Nos. 95,203 and 95,250, filed March 13, 1961, now abandoned.

Heretofore the threshing or separator cylinder used to separate grain, beans and like farm crops from the growing stock has usually been either of a circumferentially spaced rasp bar construction or utilize radially extending spike teeth. Unfortunately, certain farm crops such as beans and peas are prone to cracking when harvested with such equipment with an ensuing loss in revenue to the farm operators.

Cylinder constructions of these types are also subject to being damaged by the entry of foreign material such as stones or scrap metal with the harvested crop and when such damage occurs costly and time-consuming delays ensue just when the farmer is needing to get his crop harvested at proper ripeness and moisture content.

It has been proposed to overcome such difficulties by the provision of a threshing cylinder made of rubber or covered with rubber as for example in the patent to Maginn 2,265,380 but such constructions have not proven satisfactory because the solid rubber portions which contact the crop, and any foreign material, and not sufficiently yielding, particularly with easily cracked crops, and they function very similarly to metal cylinders.

It is an object of this invention to provide a new and different form of threshing cylinder and one which is less injurious of the farm crop being harvested. Such a cylinder is of a resilient construction and includes numerous features assuring efficient operation, long serviceable life, and due protection of the crop being harvested. It is sufficiently simple in construction, readily installed and easily serviced to provide numerous advantages over other forms of threshing cylinders without the commonly known disadvantages thereof.

More specifically it is an object to provide an improved cylinder construction utilizing a rubber-like surface for contacting the crops and which provides a readily yieldable cylindrical wall supported against inward deflection merely by fluid pressure plus the small amount of centrifugal force exerted by the mass of the wall augmented as desired by additional internal located mass.

It is also an object to provide an improved cylinder construction utilizing an inflated rubber-like bag or tire in which the rubber-like portions may provide a true cylindrical wall of long axial dimension compared to its diameter and which provides more uniform yieldability over its entire surface with ease of mounting upon a driven axle arrangement good sealing and with precise limitations of radial expansion uniformly along its full length.

It is also an object to provide a threshing device comprising a concave grate and a yielding walled cylinder which will take less power per unit of concave area to perform a given amount of threshing.

A further object is to provide such a threshing mechanism which can be operated at higher speeds, with longer arcs of contact between the cylinder and the concave and which can handle more crops per unit of time than previously known threshing mechanism of equal size.

Another object is to provide a threshing mechanism which will reduce the number of times each kernel is contacted by the cylinder, that is to reduce the likelihood of rebounding of the kernels against the cylinder and thus reduce the possibility of cracking or otherwise damaging the grain.

A further object is to provide a threshing cylinder and concave construction which is less sensitive to non-uniformly distributed crops at entry, that is, where the incoming crop is of varying density along the length of the cylinder.

A further object is to provide a threshing mechanism which will be well adapted to threshing all varieties of crops from small seeds to beans and corn with good efficiency.

The numerous advantages obtained in the use of this particular threshing cylinder, and the novel features thereof, will be best understood and appreciated upon a reading of the following specification and upon a study of the appended drawings wherein.

Figure 1:
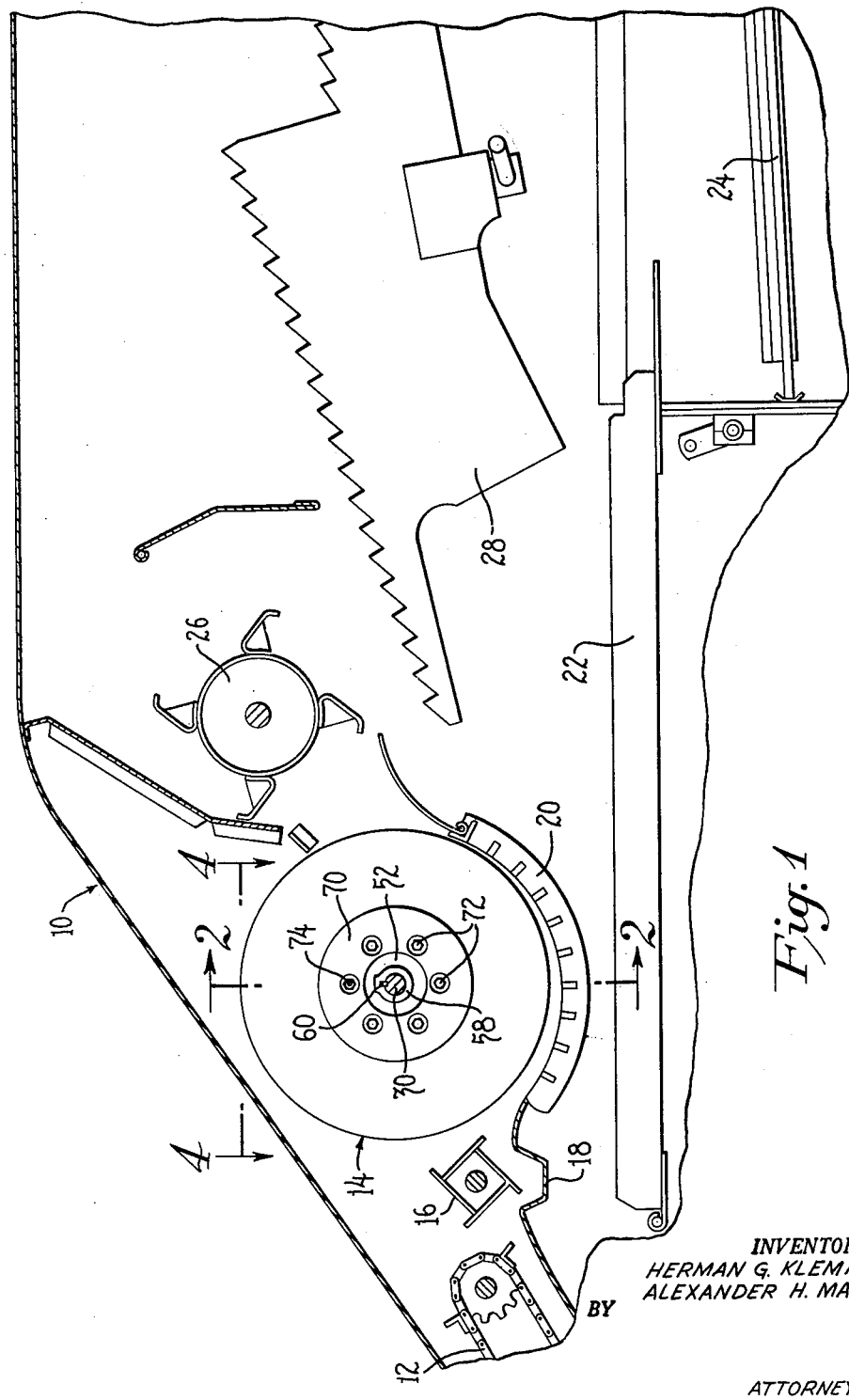
FIGURE 1 is a cross-sectional plan view of the internal mechanism of a threshing machine showing the threshing cylinder of this invention and the disposition of operatively associated parts thereof.

The commonly known threshing machine for harvesting farm crops is shown in FIGURE 1. The machine 10 includes an endless chain driven floating elevator 12 for carrying the harvested crops to the threshing cylinder 14. A suitably mounted stripper beater 16 is interposed between the end of the floating elevator 12 and threshing cylinder 14 to guide the crop against the guide pan 18 and between the threshing cylinder and the grate concave 20.

The threshing cylinder 14 is provided and is formed and mated with the grate concave 20 to move the crop over the open bar mesh of the grate and effect threshing and separation of the grain or other farm crop from the chaff, straw, vines, stalks and other material. A grain pan 22 is provided under the grate concave 20 and leads to a chaffer sieve 24 where the grain and chaff are separated. The material which leaves the concave is next fed under a drum beater 26 where it is evened out and fed on to the straw walkers 28. Any of the crop not separated out by the threshing cylinder 14 or drum beater 26 is shaken free on the straw walkers and falls through to the grain pan 22 and chaffer sieve 24.

The particular threshing cylinder 14 of this invention is shown in greater detail by the remaining figures of the drawings.

The threshing cylinder 14 includes a supporting shaft 30 extending through the side walls 32 and 34 of the threshing machine 10 and journalled within bearings 36 and 38 disposed externally thereof. It will be noted that the bearing members 36 and 38 are retained by suitable flanges 40 and bolt means 42 for ready removal, if required.

The cylinder supporting shaft 30 has a sprocket wheel 44 provided on one end thereof and has the sprocket members engaged with a sprocket chain 46 for operation thereof.

An internal drum 48 is provided on the shaft 30, between the side walls 32 and 34, and includes end wall flanges 50 and 52 bearing a cylindrical part 54 secured therebetween and disposed concentrically about the drive shaft 30. The flanges 50 and 52 each include a hub portion 56 and 58, respectively, received on the shaft 30 and positioned by a key 60 secured to the shaft near each end thereof.

The one end wall flange 50 extends beyond the surface of the drum cylinder 54 and is formed as an external lip 62 which is cooperative with an annular part 64 to retain the bead of the actual threshing cylinder part 80 therebetween. Suitable fastener means 66 are provided to lock the retainer parts together.

The other end wall flange 52 terminates at the surface of the drum cylinder 54 and includes an annular rib 68 on the outside face thereof which is cooperative with a ring 70 to retain the other bead of the actual threshing cylinder part 80 thereto. The retainer ring 70 is formed to accommodate suitable fastener means 72 to lock the retainer parts together and a fitting 74 for filling the threshing bag (to be described) with air or other fluid. A passage 76 formed in the end wall flange 52 communicates with the fitting 74 as shown.

The threshing cylinder part 80 is, in effect, a pneumatic cylinder which is disposed on the drum cylinder 54. It includes a nylon cord or like fabric casing 82 embedded in a rubber or rubber-like composition and formed to provide a resilient bag supported on the drum 54 and rotated by the drive shaft 30. The fabric casing 82 is formed of strong nylon or similar cords 84 which extend axially across the bag and are looped about wire bands 86 within the edges of the bag to form the beads 88.

The pneumatic bag or cylinder 80 includes radially disposed and axially spaced portions 90 which extend from the outer wall 92 to the surface of the drum cylinder 54.

In general appearance these members look much like thick spokes and, in effect, they serve a similar purpose.

The outer wall reinforcing spokes 90 which are axially aligned have an undulating fabric band 94 running therethrough. This provides individual and cumulative strength for the spokes much in the manner of corrugation used in cardboard. The spokes retain the cylindrical configuration of the outer cylinder wall 92 and yet will yield at and between the spokes sufficiently to prevent damage to the exterior of the cylinder wall or the crop engaged thereby.

The outer wall 92 of the pneumatic cylinder 84 includes wire reinforcing rings 96 provided circumferentially therethrough for hoop strength and has a waffle-like tread pattern 98 formed on the external surface thereof. The tread pattern 98 includes groove waves which extend around the pneumatic cylinder and are effective in providing sufficient traction to carry the crop across the grate concave 20 without crushing and cracking the crop in the process.

Figure 2:
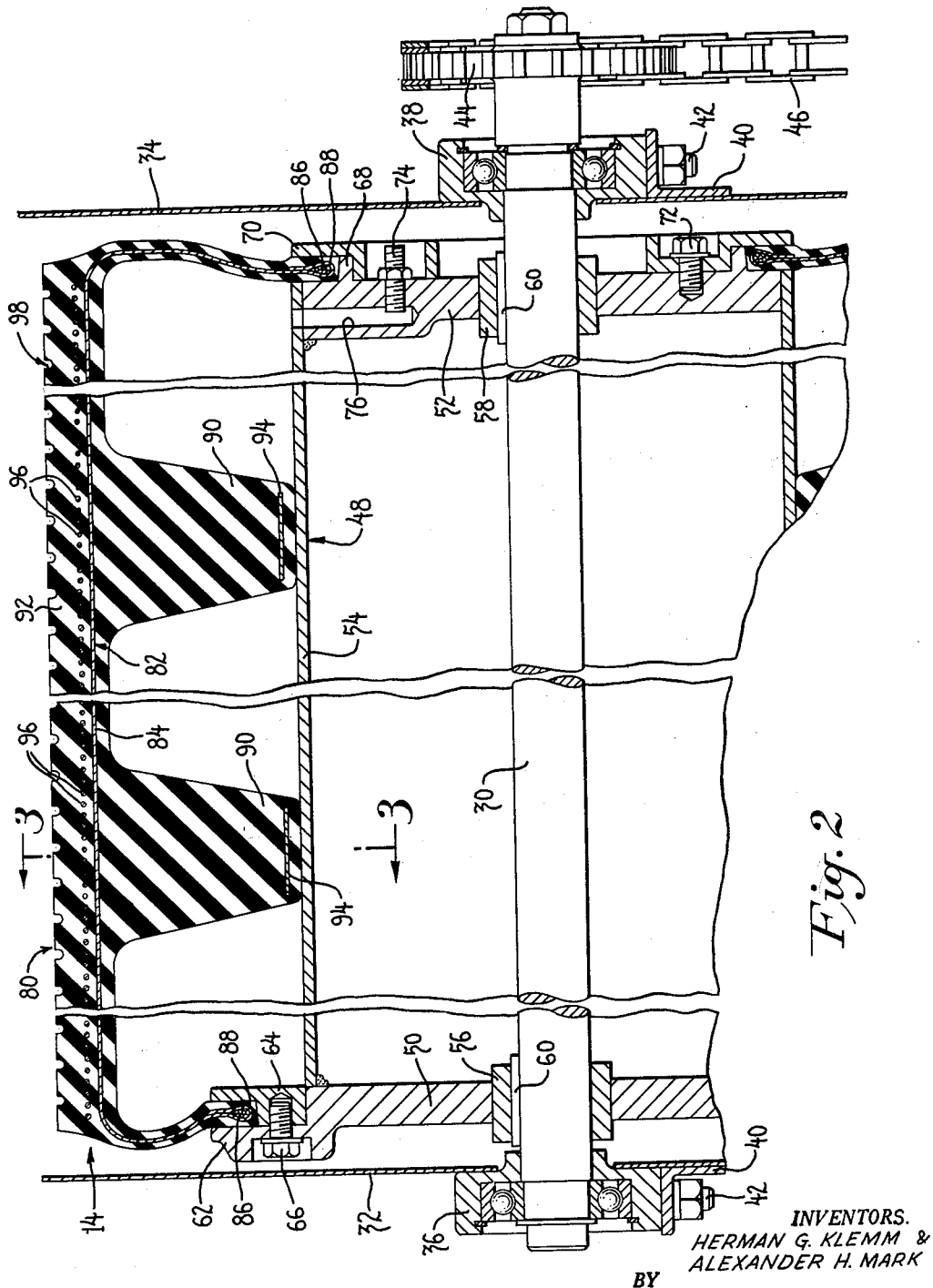
FIGURE 2 is an enlarged cross-sectional view of the threshing cylinder of this invention, axially therethrough, as seen on the plane of line 2—2 of FIGURE 1 and looking in the general direction of the arrows thereon.
Figure 3:
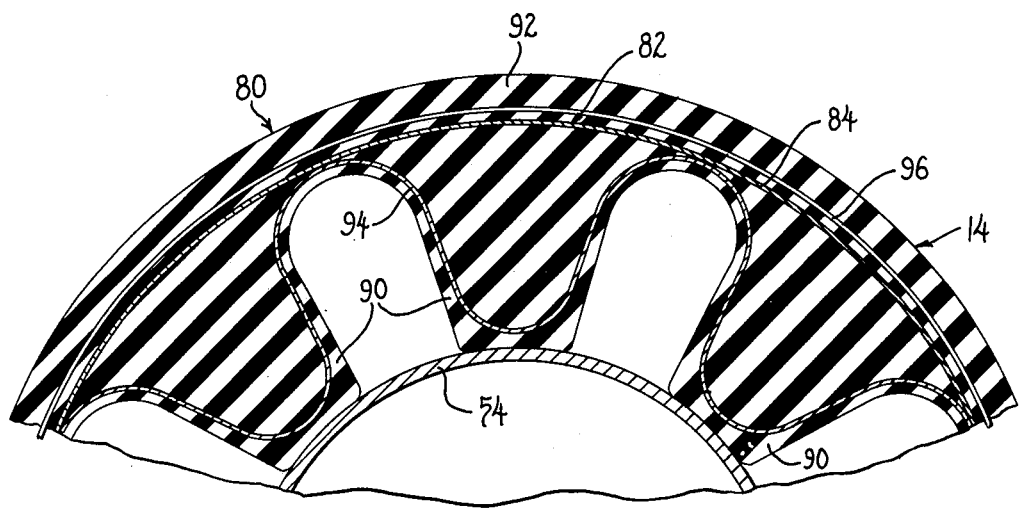
FIGURE 3 is a cross-sectional end view of a fragmentary section of the threshing cylinder of this invention as seen in the plane of line 3—3 of FIGURE 2, looking in the general direction of the arrows thereon.
Figure 4:
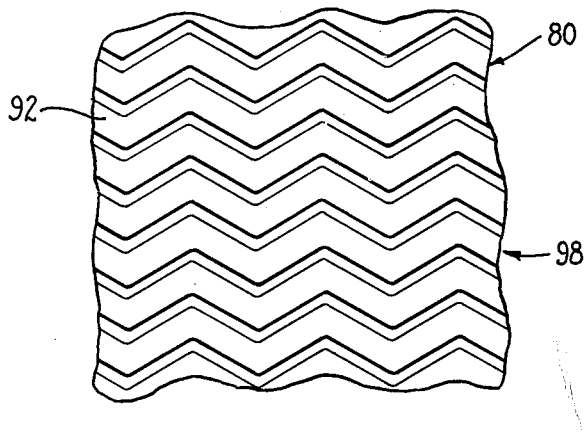
FIGURE 4 is an enlarged and fragmentary view of the peripheral surface of the threshing cylinder of this invention as seen in the plane of line 4—4 of FIGURE 1, looking in the general direction of the arrows thereon.

It will be appreciated that the disposition of the pneumatic cylinder retaining means below the surface of the supporting drum 54, at one end thereof, enables the cylinder or bag to be readily assembled on the drum without any concern about the drum engaging spokes 90. An added feature to facilitate assembly is in having the retainer ring 64 adhesively bonded to the inside of the shorter bag retaining bead 88; reference being had to the left hand side of the assembly shown by FIGURE 2.

The pneumatic cylinder 84 may be filled with air or hydraulic fluid to assure greater rigidity of the outer wall 92, or may be used without any pneumatic fluid where more resilience is required.

Figure 5:
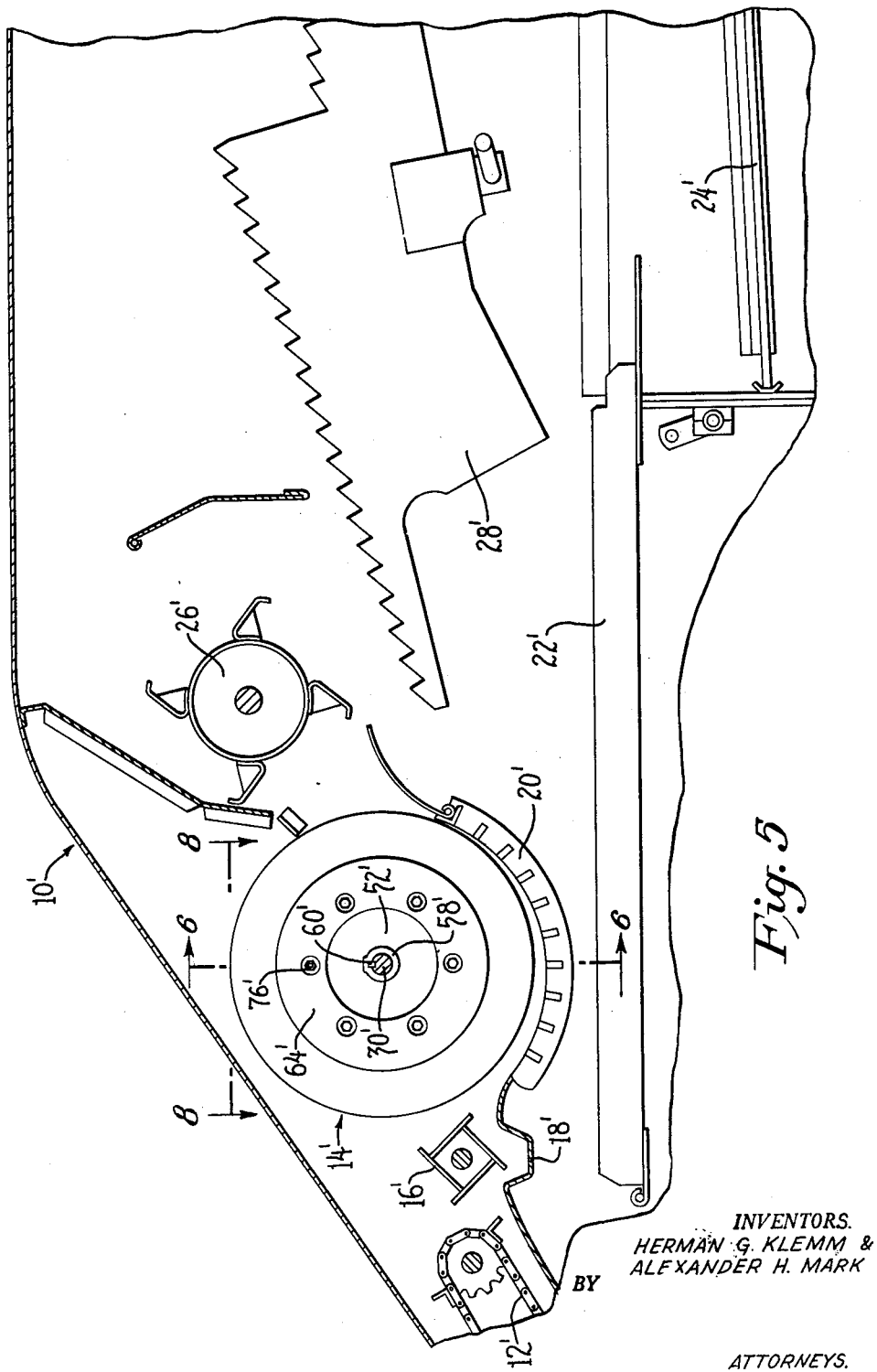
FIGURE 5 is a cross-sectional plan view of the internal mechanism of a threshing machine showing another threshing cylinder also embodying this invention and the disposition of operatively associated parts thereof.
Figure 6:
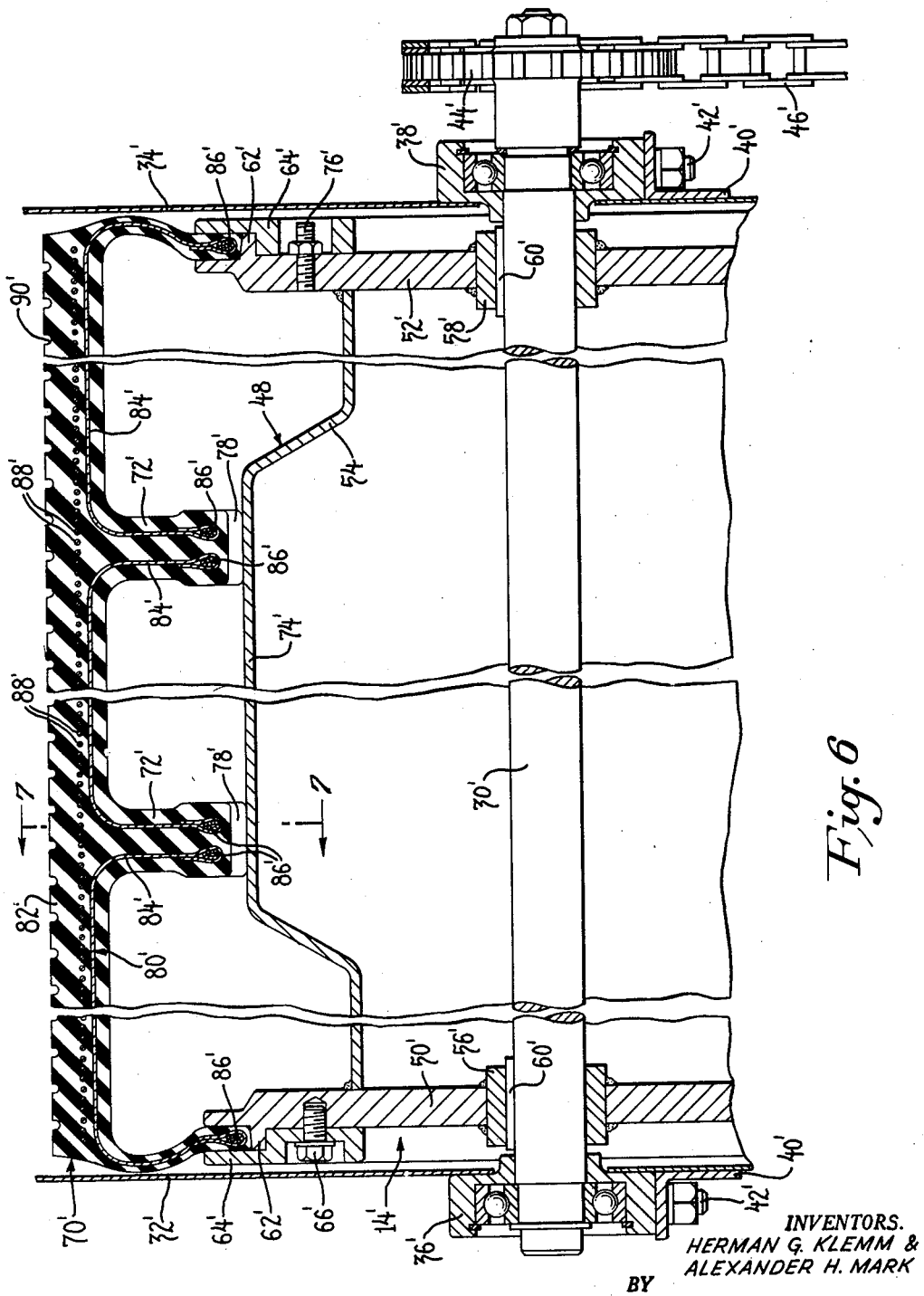
FIGURE 6 is an enlarged cross-sectional view of the threshing cylinder of this invention, axially therethrough, as seen on the plane of line 6—6 of FIGURE 5 and looking in the general direction of the arrows thereon.
Figure 7:
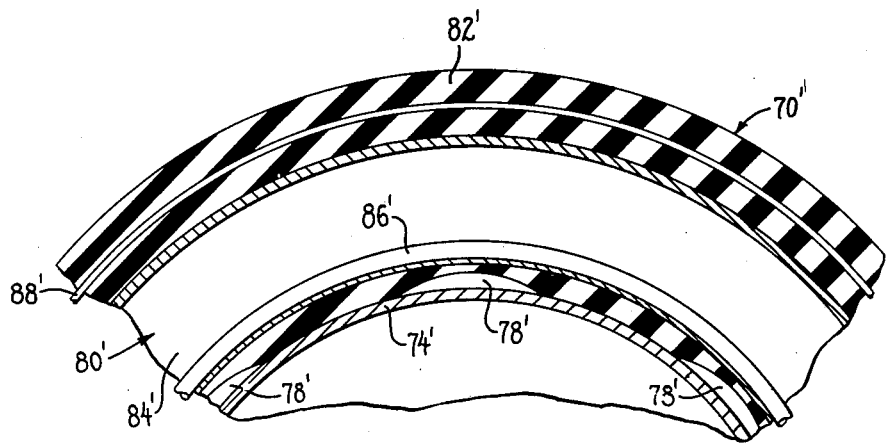
FIGURE 7 is a cross-sectional end view of a fragmentary section of the threshing cylinder of this invention as seen in the plane of line 7—7 of FIGURE 6, looking in the general direction of the arrows thereon.
Figure 8:
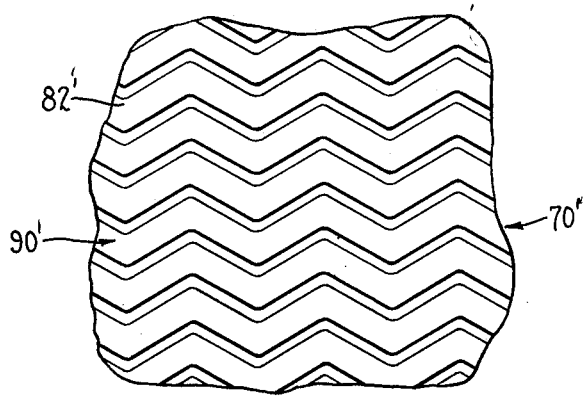
FIGURE 8 is an enlarged and fragmentary view of the peripheral surface of the threshing cylinder of this invention as seen in the plane of line 8—8 of FIGURE 5, looking in the general direction of the arrows thereon.

In the embodiment of the invention shown in FIGURES 5 to 8, parts corresponding to those previously described have been given identical reference numerals with a distinguishing prime mark added. Thus, FIGURE 5 shows a machine 10' including an endless chain driven floating elevator 12' for carrying the harvested crops to the threshing cylinder 14'. A suitably mounted stripper beater 16' is interposed between the end of the floating elevator 12' and threshing cylinder 14' to guide the crop against the guide pan 18' and between the threshing cylinder and the grate concave 20'.

The threshing cylinder 14' is provided and is formed and mated with the grate concave 20' to move the crop over the open bar mesh of the grate and effect threshing and separation of the grain or other farm crop from the chaff, straw, vines, stalks and other material. A grain pan 22' is provided under the grate concave 20' and leads to a chaffer sieve 24' where the grain and chaff are separated.

The material which leaves the concave is next fed under a drum beater 26' where it is evened out and fed on to the straw walkers 28'. Any of the crop not separated out by the threshing cylinder 14' or drum beater 26' is shaken free on the straw walkers and falls through to the grain pan 22' and chaffer sieve 24'.

The particular threshing cylinder 14' of this invention is shown in greater detail by the remaining figures of the drawings.

The threshing cylinder 14' includes a supporting shaft 30' extending through the side walls 32' and 34' of the threshing machine 10' and journalled within bearings 36' and 38' disposed externally thereof. It will be noted that the bearing members 36' and 38' are retained by suitable flanges 40' and bolt means 42' for ready removal, if required.

The cylinder supporting shaft 30' has a sprocket wheel 44' provided on one end thereof and has the sprocket members engaged with a sprocket chain 46' for operation thereof.

An internal drum 48' is provided on the shaft 30', between the side walls 32' and 34', and includes end wall flanges 50' and 52' bearing a cylindrical part 54' secured therebetween and disposed concentrically about the drive shaft 30'. The flanges 50' and 52' each include a hub portion 56' and 58', respectively, received on the shaft 30' and positioned by a key 60' secured to the shaft near each end thereof.

Each of the end wall flanges 50' and 52' of the drum 48' is formed to include an annular rib 62' on the outer side face thereof which cooperates with a complementary retainer ring 64', and suitable fastening means 66', to retain a pneumatic cylinder 70' on the drum member 48'.

The pneumatic bag or cylinder 70' is made of rubber or other resilient material and is formed to include a plurality of radially disposed and axially spaced internal walls 72'. The internal walls 72' are formed for engagement with an enlarged centrally disposed portion 74' of the supporting drum 48'.

The smaller end sections of the drum 48' will provide for direct communication through the end wall 52' of the drum, via fitting 76', for filling the pneumatic bag or cylinder 70' with air or other pneumatic fluid. In this regard, it will be noted that the annular supporting walls 72' of the pneumatic cylinder are formed at their drum engaging periphery to provide cross-feeding passageways 78' therebetween.

A nylon cord fabric casing 80' is embedded within the outer peripheral wall 82' of the pneumatic cylinder and extends into the supporting walls 72' and end walls of the cylinder. In the presently disclosed instance the casing 80' is formed of separate parts 84' extending just between adjacently disposed end and supporting walls. The ends of the casing parts 84' are folded over and about wire bands 86' near the edges of the end and supporting walls. This particular construction provides hoop-strength at the inner peripheral edges of the end and supporting walls and a double or sandwich-like reinforcement within the internally disposed supporting walls 72'.

The outer wall 82' of the pneumatic cylinder 70' includes wire cords 88' provided circumferentially therein for hoop-strength and has a tread pattern 90' formed on the external surface thereof. The tread pattern 90' includes wavy grooves which extend around the cylinder and are effective in providing sufficient traction to carry the crop across the grate concave 20' without damaging the crop in the process.

The pneumatic cylinder may be filled with air or hydraulic fluid to provide greater rigidity of the outer wall or may be used without any pneumatic fluid where more resilience is desirable.

In use the rotation of the cylinder rubs the moving mat of harvested crops against the combine in a manner generally analogous to a conventional thresher. The rubber-like tread pattern engages the crop with a higher friction than metal and assists in pulling and rubbing the crops through and in stripping the kernels or beans from their husks, heads, pods or cobs.

Unlike conventional threshers the cylindrical wall surface is flexible and may be depressed inward if the thickness of crops between cylinder and concave at any point is sufficient. It is yieldably maintained in its normally fully extended position by both air pressure and by centrifugal force. The force however, when once established by a given charge in the cylinder, remains substantially constant regardless of the thickness of the crop mat on the concave.

By utilizing this method of rubbing the crops against an uninterrupted flexible wall through which a predetermined force is applied independently of the amount of crop present at any local point it is possible to thresh with less power and at higher rates of through-put. It is also possible to thresh with less damage and with a wider range of crop varieties with a single threshing assembly. Adaptation to different varieties and differing field conditions is relatively simple. The method also greatly reduces slugging and wrapping difficulties and permits a greater arc of embrace of the cylinder by the concave thus adding to the capacity for a given size of cylinder.

We claim as our invention:

1. In a threshing machine, the combination comprising, a frame, a semi-cylindrical concave mounted in said frame and opening upwardly, a shaft journalled in said frame above said concave, a drum portion on said shaft, a cylinder mounted on said drum portion and having a thin flexible cylindrical wall disposed for rotation just above said concave, said cylindrical wall being axially elongated so as to extend from side to side of said concave and having a smooth outer surface lying equidistantly from said shaft axis with outwardly opening shallow grooves defining a tread pattern, said cylinder also having flexible portions formed integrally with said cylindrical wall and extending from the wall to said drum portion so as to resiliently hold the wall in its cylindrical conformation, a plurality of wire rings embedded in axially spaced relation within said cylindrical wall to impart hoop strength thereto, and means for selectively adding internal stiffness and mass to said cylinder.

2. The combination of claim 1 in which said means permits the addition to said cylinder of gas and liquid in selected amounts so as to control the radial stiffness and centrifugal weight of said cylindrical wall.

3. The combination of claim 1 including a pair of annular flanges on said shaft one at each end of said drum portion, said cylinder having annular end walls at the ends of said cylinder wall with the inner edges of said end walls being sealed to respective ones of said flanges, and said flexible portions defining axially and peripherally extending passages so as not to subdivide the interior of said cylinder.

4. The combination of claim 3 in which one of said flanges has a greater diameter than the other and the end wall secured to this flange has a correspondingly larger diameter so as to permit the cylinder to easily move axially from said shaft.

References Cited in the file of this patent

UNITED STATES PATENTS

| | | |
|---|---|---|
| 227,886 | Eaton | May 25, 1880 |
| 663,218 | Crippen | Dec. 4, 1900 |
| 1,427,000 | Lewinski | Aug. 22, 1922 |
| 2,246,117 | Wallace | June 17, 1941 |
| 2,265,380 | Maginn | Dec. 9, 1941 |
| 2,347,622 | Tschanz | Apr. 25, 1944 |
| 2,607,072 | Johnson | Aug. 19, 1952 |
| 2,802,541 | Albee | Aug. 13, 1957 |